US012590201B2

(12) United States Patent
Takayama et al.

(10) Patent No.: US 12,590,201 B2
(45) Date of Patent: Mar. 31, 2026

(54) DEGRADATION PROMOTER FOR ALIPHATIC POLYESTER BIODEGRADABLE RESIN, BIODEGRADABLE RESIN COMPOSITION, AND METHOD FOR PROMOTING DEGRADATION OF ALIPHATIC POLYESTER BIODEGRADABLE RESIN

(71) Applicant: Ube Material Industries, Ltd., Ube (JP)

(72) Inventors: Tetsuo Takayama, Yonezawa (JP); Toru Inagaki, Ube (JP); Yuzo Kato, Ube (JP)

(73) Assignee: UBE MATERIAL INDUSTRIES, LTD., Ube (JP)

( * ) Notice: Subject to any disclaimer, the term of this patent is extended or adjusted under 35 U.S.C. 154(b) by 634 days.

(21) Appl. No.: 17/913,287

(22) PCT Filed: Mar. 1, 2021

(86) PCT No.: PCT/JP2021/007757
§ 371 (c)(1),
(2) Date: Sep. 21, 2022

(87) PCT Pub. No.: WO2021/199840
PCT Pub. Date: Oct. 7, 2021

(65) Prior Publication Data
US 2023/0167267 A1      Jun. 1, 2023

(30) Foreign Application Priority Data
Mar. 30, 2020      (JP) ................................. 2020-059410

(51) Int. Cl.
| | |
|---|---|
| *C08K 3/30* | (2006.01) |
| *C08G 63/16* | (2006.01) |
| *C08K 7/08* | (2006.01) |

(52) U.S. Cl.
CPC ................ *C08K 3/30* (2013.01); *C08G 63/16* (2013.01); *C08K 7/08* (2013.01); *C08G 2230/00* (2013.01); *C08K 2003/3063* (2013.01)

(58) Field of Classification Search
CPC .... C08L 67/00; C08K 3/30; C08K 2003/3045
See application file for complete search history.

(56) References Cited

U.S. PATENT DOCUMENTS

| | | | |
|---|---|---|---|
| 5,433,870 A | 7/1995 | Nakamaru et al. | |
| 5,624,887 A | 4/1997 | Nakamaru et al. | |
| 2021/0332237 A1 | 10/2021 | Takayama et al. | |

FOREIGN PATENT DOCUMENTS

| | | | |
|---|---|---|---|
| CN | 105462193 A | 4/2016 | |
| CN | 106543651 A | 3/2017 | |
| CN | 106008931 B | 9/2017 | |
| CN | 113227219 A | 8/2021 | |
| JP | 4-122438 A | 4/1992 | |
| JP | 6-200280 A | 7/1994 | |
| JP | 2005-307128 A | 11/2005 | |
| JP | 2007-99794 A | 4/2007 | |
| JP | 2010-155392 A | 7/2010 | |
| JP | 2010-270309 A | 12/2010 | |

OTHER PUBLICATIONS

Gao et al., "Thermal, Crystallographic, and Mechanical Properties of Poly(butylene succinate)/Magnesium Hydroxide Sulfate Hydrate Whisker Composites Modified by in Situ Polymerization", Industrial & Engineering Chemistry Research, 2017, vol. 56, pp. 3516-3526, cited in Specification (12 pages).
International Search Report dated Apr. 27, 2021, issued in counterpart International Application No. PCT/JP2021/007757 (3 pages).

*Primary Examiner* — Wenwen Cai
(74) *Attorney, Agent, or Firm* — WHDA, LLP

(57) ABSTRACT

The degradation promoter for an aliphatic polyester biodegradable resin according to the present invention contains basic magnesium sulfate.

6 Claims, No Drawings

DEGRADATION PROMOTER FOR ALIPHATIC POLYESTER BIODEGRADABLE RESIN, BIODEGRADABLE RESIN COMPOSITION, AND METHOD FOR PROMOTING DEGRADATION OF ALIPHATIC POLYESTER BIODEGRADABLE RESIN

TECHNICAL FIELD

The present invention relates to a degradation promoter for an aliphatic polyester biodegradable resin, a biodegradable resin composition, and a method for promoting degradation of an aliphatic polyester biodegradable resin.

BACKGROUND ART

In recent years, marine pollution by discarded plastic has become a major global problem. Since plastics discarded in the sea maintains its shape for a prolonged period of time, it has been pointed out that the plastic has an influence on an ecosystem such as eating disorder of marine organisms. In addition, microplastics micronized by ultraviolet rays or the like affect the food chain by intake of marine organisms, and may eventually be harmful to the human body. With the global awareness of SDGs, there is a need for biodegradable plastics, particularly biodegradable plastics having marine degradability.

Biodegradable resin compositions with enhanced various properties while maintaining biodegradability have been proposed. For example, a resin composition is disclosed in which wollastonite as an inorganic filler is blended in an aliphatic polyester resin (polybutylene succinate-lactic acid copolymer) to improve rigidity, heat resistance, and impact resistance while maintaining biodegradability (see, for example, Patent Literature 1).

It has also been reported that mechanical properties (flexural modulus) of polybutylene succinate (PBS) were improved by blending flabellate basic magnesium sulfate in PBS (see, for example, Non Patent Literature 1).

CITATION LIST

Patent Literature

Patent Literature 1: JP 2007-99794 A

Non Patent Literature

Non Patent Literature 1: Ind. Eng. Chem. Res. 2017, 56, 3516-3526

SUMMARY OF INVENTION

Technical Problem

An aliphatic polyester obtained by a polycondensation method from an aliphatic dicarboxylic acid and a glycol is known as a chemically synthesized biodegradable plastic. Although a succinic acid biodegradable resin including polybutylene succinate-adipate (PBSA) has marine degradability, it is desired to further enhance the marine degradability. This PBSA has low rigidity due to its softness and has limited applications. There is a demand for a biodegradable resin composition that has more excellent marine degradability than a conventional one and gives a molded body having a high flexural modulus.

Therefore, an object of the present invention is to provide a degradation promoter for an aliphatic polyester biodegradable resin having a higher effect than a conventional one, a biodegradable resin composition that has excellent marine degradability and gives a molded body having a high flexural modulus, and a method for promoting degradation of an aliphatic polyester biodegradable resin.

Solution to Problem

The degradation promoter for an aliphatic polyester biodegradable resin according to the present invention contains basic magnesium sulfate.

The biodegradable resin composition according to the present invention contains polybutylene succinate-adipate and basic magnesium sulfate.

The method for promoting degradation of an aliphatic polyester biodegradable resin according to the present invention includes adding basic magnesium sulfate to the aliphatic polyester biodegradable resin and then kneading the mixture.

Advantageous Effects of Invention

According to the present invention, it is possible to provide a degradation promoter for an aliphatic polyester biodegradable resin having a higher effect than a conventional one, a biodegradable resin composition that has excellent marine degradability and gives a molded body having a high flexural modulus, and a method for promoting degradation of an aliphatic polyester biodegradable resin.

DESCRIPTION OF EMBODIMENTS

The present inventors have made intensive studies and have thereby found that basic magnesium sulfate has an action of promoting degradation of an aliphatic polyester biodegradable resin, particularly, polybutylene succinate-adipate (PBSA). In a resin composition obtained by blending basic magnesium sulfate in polybutylene succinate-adipate (PBSA), its degradation in seawater is promoted more than that of a conventional one. Moreover, such a resin composition is used, whereby a molded body having a high flexural modulus can be obtained. The present invention has been made based on such findings.

Hereinafter, embodiments of the present invention will be described in detail.

<Basic Magnesium Sulfate>

Basic magnesium sulfate is represented by $MgSO_4 \cdot 5Mg(OH)_2 \cdot 3H_2O$, and can be obtained by, for example, hydrothermal synthesis using magnesium sulfate and an alkaline substance such as sodium hydroxide, magnesium hydroxide, magnesium oxide, or calcium hydroxide as raw materials. As the basic magnesium sulfate, either fibrous basic magnesium sulfate or flabellate basic magnesium sulfate may be used. Fibrous basic magnesium sulfate is preferable, but fibrous basic magnesium sulfate and flabellate basic magnesium sulfate can be used in combination.

Fibers of fibrous basic magnesium sulfate have an average fiber length in the range of generally 2 to 100 μm and preferably 5 to 50 μm, and an average fiber diameter in the range of generally 0.1 to 2.0 μm and preferably 0.1 to 1.0 μm. The fibers of fibrous basic magnesium sulfate have an average aspect ratio (average fiber length/average fiber diameter) of generally 2 or more, preferably 3 to 1000, more preferably 3 to 100, and particularly preferably 5 to 50. Note that, the average fiber length and the average fiber diameter of fibers of fibrous basic magnesium sulfate can be calculated from the number average values of the fiber length and the fiber diameter respectively, which are measured by image analysis from images magnified with a scanning electron microscope (SEM).

The flabellate basic magnesium sulfate is particles in which multiple fibers of fibrous basic magnesium sulfate are partially joined to each other and connected into a flabellate shape, and the particles have, for example, an average particle length of 2 to 100 μm, an average particle width of 1 to 40 μm, and an average aspect ratio of about 1 to 100. Here, the average particle length refers to the dimension in the longitudinal axis of the particle, and the average particle width refers to the maximum dimension in the lateral axis of the particle. The longitudinal axis of the particle is an axis in which the particle length is maximized, and the lateral axis of the particle is an axis orthogonal to the longitudinal axis. The average aspect ratio is a ratio of an average particle length/average particle diameter.

The fibers of fibrous basic magnesium sulfate constituting a particle of flabellate basic magnesium sulfate each have an average fiber length of 2 to 100 μm, an average fiber diameter of 0.1 to 5 μm, and an average aspect ratio of 1 to 1000. Multiple fibers of fibrous basic magnesium sulfate are, for example, bundled at one ends and spread at the other ends. Multiple fibers of fibrous basic magnesium sulfate may also be bundled at arbitrary positions in the longitudinal axes and spread at both ends. Such flabellate basic magnesium sulfate can be produced and identified in accordance with methods described in, for example, JP H4-36092 B, JP H6-99147 B, and the like.

In addition, the flabellate basic magnesium sulfate is not necessarily in a state in which individual fiber of fibrous basic magnesium sulfate is identified, and may be in a state in which some fibers of fibrous basic magnesium sulfate are joined to each other along the longitudinal axes. When it is confirmed that fibers of fibrous basic magnesium sulfate having the shape as described above and further having an average fiber length, an average fiber diameter, and an average aspect ratio in predetermined ranges are contained, the fibrous basic magnesium sulfate can be regarded as flabellate basic magnesium sulfate used in the present invention.

Wollastonite and the like are known as an inorganic filler that is blended in a biodegradable resin for improving physical properties. Because wollastonite does not dissolve in seawater, it is released into the ocean as a degradation residue of the biodegradable resin. In this case, an unexpected problem may occur due to accumulation of the released wollastonite.

On the other hand, basic magnesium sulfate degrades in seawater and generates no residue, so that such a problem can be avoided. Basic magnesium sulfate degrades into magnesium sulfate ($MgSO_4$) and magnesium hydroxide ($Mg(OH)_2$) in seawater. It is presumed that magnesium sulfate is dissolved in seawater, and magnesium hydroxide reacts with an acidic component present in the atmosphere to be dissolved as a Mg salt.

<Biodegradable Resin>

Examples of the biodegradable resin to which the degradation promoter of the present invention is applied include an aliphatic polyester biodegradable resin, which is a polycondensate of an aliphatic dicarboxylic acid and a glycol. Examples of the aliphatic dicarboxylic acid include succinic acid and adipic acid, and an aliphatic polyester biodegradable resin synthesized by polycondensation of these aliphatic dicarboxylic acids and a glycol can be suitably used.

Examples of the succinic acid biodegradable resin include polybutylene succinate (PBS), polybutylene succinate-adipate (PBSA), and polybutylene succinate-lactate (PBSL). Further, examples thereof include polybutylene succinate-hydrocaproate (PBSLC), polybutylene succinate-carbonate (PBSC), polybutylene succinate-terephthalate (PBST), polybutylene succinate-diethylene glycol succinate (PBS-co-DEGS), polybutylene succinate-butylene (PBS-co-BDGA), and polybutylene succinate-fluonate (PBSF).

Examples of the adipic acid biodegradable resin include polybutylene adipate (PBA), polybutylene adipate-terephthalate (PBAT), and polyethylene adipate-terephthalate (PEAT).

These biodegradable resins may be used singly or in combination of two or more thereof. The degradation promoter of the present invention containing basic magnesium sulfate is particularly effective in promoting degradation of PBSA among the biodegradable resins described above.

Degradation of the aliphatic polyester biodegradable resin can be promoted by adding basic magnesium sulfate to the aliphatic polyester biodegradable resin and then kneading the mixture. In this case, basic magnesium sulfate is desired to be present at a percentage of 1 to 70% and more preferably 1 to 50% with respect to the total mass of the aliphatic polyester biodegradable resin and the basic magnesium sulfate. Other components may be present as long as degradation of the aliphatic polyester biodegradable resin is not hindered.

<Polybutylene Succinate-Adipate (PBSA)>

The biodegradable resin composition of the present invention contains polybutylene succinate-adipate (PBSA). Polybutylene succinate-adipate (PBSA) is particularly excellent in marine degradability, resin physical properties, and the like, and can be synthesized by a polycondensation method using, for example, 1,4-butanediol, succinic acid, and adipic acid.

<Method for Producing Biodegradable Resin Composition>

In production of the biodegradable resin composition of the present invention, first, PBSA and basic magnesium sulfate are mixed. For the mixing, a tumbler, a blender, a Henschel mixer, or the like can be used. The amount of basic magnesium sulfate contained in the biodegradable resin composition is preferably 1 to 70%, and more preferably 1 to 50% when the total mass of PBSA and the basic magnesium sulfate is 100.

The obtained mixture is melt-kneaded at 160 to 210° C. using a twin-screw kneader or the like, and thus, the biodegradable resin composition of the present invention is obtained. The biodegradable resin composition of the invention is blended with basic magnesium sulfate, thereby having higher marine degradability than a conventional one. Moreover, it is possible to produce a molded body having a high flexural modulus by using the biodegradable resin composition of the invention.

The biodegradable resin composition of the present invention may contain other components as long as the effects of the invention are not impaired.

<Molded Body>

The biodegradable resin composition of the present invention is molded, whereby various molded bodies can be produced. For molding the resin composition, for example, a roll molding machine (such as a calender molding machine), a vacuum molding machine, an extrusion molding machine, an injection molding machine, a blow molding machine, or a press molding machine can be used.

Since the molded body of the present invention is produced using the resin composition containing PBSA, the molded body is a soft biodegradable plastic. Soft biodegradable plastics can be used in film/sheet products of packaging materials, such as agricultural multi-films and waste bags.

The molded body of the present invention is suitably used in a wide range of applications such as packaging materials for packaging a liquid, granular, or solid product of various foods, chemicals, and miscellaneous goods; agricultural materials; and building materials. Specific examples thereof include injection molded articles (e.g., fresh food trays, coffee capsules, fast food containers, outdoor leisure products, and the like), extrusion molded articles (film, e.g., fishing line, fishing net, vegetation net, water retention sheet, and the like), and hollow molded articles (bottles and the like).

Further, other examples thereof include agricultural films, coating materials, coating materials for fertilizers, laminate films, plates, stretched sheets, monofilaments, nonwoven fabrics, flat yarns, staples, crimped fibers, scored tapes, split yarns, composite fibers, blow bottles, shopping bags, waste bags, compost bags, cosmetic containers, detergent containers, bleaching agent containers, ropes, binding materials, sanitary cover stock materials, cold insulation boxes, cushion material films, multifilaments, synthetic paper; and for medical use, surgical threads, sutures, artificial bones, artificial skins, drug delivery systems (DDS) such as microcapsules, and wound covering materials.

Furthermore, the molded body of the present invention can be used for information electronic materials such as toner binders and thermal transfer ink binders; and automobile parts including automobile interior parts such as electric product housings, instrument panels, sheets, and pillars, and automobile exterior structural materials such as bumpers, front grilles, and wheel covers. Examples that are more preferable among the above are packaging materials including packaging films, bags, trays, capsules, bottles, cushioning foams, and fish boxes; and agricultural materials. Examples of the agricultural materials include a mulching film, a tunnel film, a house film, a sunscreen, a grass protection sheet, a ridge sheet, a germination sheet, a vegetation mat, a seedling growing bed, and a pot.

As described above, the biodegradable resin composition of the present invention has excellent marine degradability, and the flexural modulus can be adjusted by the amount of basic magnesium sulfate to be contained, so that molded bodies for various applications can be obtained.

EXAMPLES

Specific examples of the present invention will be described below, but these do not limit the invention.

The raw materials used are summarized below.

<Basic Magnesium Sulfate>

A-1: fibrous basic magnesium sulfate MOS-HIGE A-1, manufactured by Ube Material Industries, Ltd., an average major diameter of 15 μm, an average minor diameter of 0.5 μm, an average aspect ratio of 30

A-2: flabellate basic magnesium sulfate, an average particle length of 33.0 μm, an average particle width of 6.0 μm, an average aspect ratio of 5.5

<Polybutylene Succinate-Adipate (PBSA)>

B: polybutylene succinate-adipate (BioPBS FD92PM, manufactured by PTT MCC Biochem Co., Ltd.)

<Inorganic Filler>

C: wollastonite

Example 1

Fibrous basic magnesium sulfate (A-1) (5 parts by mass) and polybutylene succinate-adipate (B) (95 parts) were mixed. The obtained mixture was melt-kneaded at 160° C. using a twin-screw melt-kneading extruder (L/D=25, manufactured by Imoto machinery Co., Ltd.) to obtain a resin composition of Example 1.

Example 2

A resin composition of Example 2 was obtained in the same manner as in Example 1 except that the amount of fibrous basic magnesium sulfate (A-1) was changed to 10 parts by mass and the amount of polybutylene succinate-adipate (B) was changed to 90 parts by mass.

Example 3

A resin composition of Example 3 was obtained in the same manner as in Example 1 except that the amount of fibrous basic magnesium sulfate (A-1) was changed to 30 parts by mass and the amount of polybutylene succinate-adipate (B) was changed to 70 parts by mass.

Example 4

A resin composition of Example 4 was obtained in the same manner as in Example 1 except that the amount of fibrous basic magnesium sulfate (A-1) was changed to 50 parts by mass and the amount of polybutylene succinate-adipate (B) was changed to 50 parts by mass.

Example 5

A resin composition of Example 5 was obtained in the same manner as in Example 1 except that fibrous basic magnesium sulfate (A-1) was changed to the same amount of flabellate basic magnesium sulfate (A-2).

Example 6

A resin composition of Example 6 was obtained in the same manner as in Example 2 except that fibrous basic magnesium sulfate (A-1) was changed to the same amount of flabellate basic magnesium sulfate (A-2).

Example 7

A resin composition of Example 7 was obtained in the same manner as in Example 3 except that fibrous basic magnesium sulfate (A-1) was changed to the same amount of flabellate basic magnesium sulfate (A-2).

Comparative Example 1

Basic magnesium sulfate (A) was not blended, and polybutylene succinate-adipate (B) was used singly for Comparative Example 1.

Comparative Example 2

A resin composition of Comparative Example 2 was obtained in the same manner as in Example 3 except that fibrous basic magnesium sulfate (A-1) was changed to the same amount of wollastonite (C).

The following Table 1 summarizes formulations of resin compositions of Examples and Comparative Examples.

TABLE 1

| | A (parts by mass) | | B (parts by mass) | C (parts by mass) |
|---|---|---|---|---|
| | A-1 | A-2 | | |
| Example 1 | 5 | | 95 | |
| Example 2 | 10 | | 90 | |
| Example 3 | 30 | | 70 | |
| Example 4 | 50 | | 50 | |
| Example 5 | | 5 | 95 | |
| Example 6 | | 10 | 90 | |
| Example 7 | | 30 | 70 | |
| Comparative Example 1 | | | 100 | |
| Comparative Example 2 | | | 70 | 30 |

<Preparation of Test Piece>

Each resin composition was molded using a small injection molding machine (C. Mobile 0813, manufactured by Shinko Celvic Co., Ltd.) to obtain a strip test piece (length: 50 mm, width: 5 mm, thickness: 2 mm) for evaluating mechanical characteristics.

<Evaluation of Flexural Modulus>

A three-point bending test was performed by a method in accordance with JISK7171 using a universal mechanical tester (manufactured by IMADA CO., LTD.). The distance between support points was 40 mm, and the loading rate was 10 mm/min. The flexural modulus was evaluated from an obtained load-deflection curve.

<Marine Degradability Test>

A molded body obtained in Example 3 or Comparative Example 1 was pulverized by freeze-pulverization to prepare a powder sample. The powder sample (76 mg of Example 3 or 53 mg of Comparative Example 1) and 200 mL of natural seawater (collected in Fukuoka City, Fukuoka Prefecture) were placed in a sealed container and stirred in a thermostatic bath at 30° C. The total oxygen consumption (TOD) of the test sample was 95.4 $mgO_2$. The oxygen consumption (BOD: biochemical oxygen demand) after 30 days was measured and the biodegradation degree (%) was calculated by $((BOD)/(TOD) \times 100)$.

The following Table 2 shows the flexural modulus of molded bodies employing respective resin compositions.

TABLE 2

| | Flexural modulus (GPa) | Degree of biodegradation (%) |
|---|---|---|
| Example 1 | 0.3 | |
| Example 2 | 0.6 | |

TABLE 2-continued

| | Flexural modulus (GPa) | Degree of biodegradation (%) |
|---|---|---|
| Example 3 | 1.5 | 43 |
| Example 4 | 3.2 | |
| Example 5 | 0.5 | |
| Example 6 | 0.6 | |
| Example 7 | 1.5 | |
| Comparative Example 1 | 0.2 | 9 |
| Comparative Example 2 | 0.8 | |

Comparison between Examples 1 to 7 and Comparative Example 1 shows that blending the basic magnesium sulfate in the polybutylene succinate-adipate improves the flexural modulus. The flexural modulus is higher as the amount of the blended basic magnesium sulfate is larger.

In addition, blending the basic magnesium sulfate significantly improves the marine degradability.

As shown in Comparative Example 2, when the inorganic filler such as wollastonite is blended, the flexural modulus can also be increased as compared with that when no wollastonite is blended (Comparative Example 1). However, wollastonite has a poor degree of biodegradation and does not degrade in the sea.

The invention claimed is:

1. A method of using basic magnesium sulfate as a degradation promoter for an aliphatic polyester biodegradable resin, comprising kneading a mixture of the aliphatic polyester biodegradable resin and basic magnesium sulfate, molding the mixture to form a molded body, and exposing the molded body to a marine environment.

2. The method of using basic magnesium sulfate as a degradation promoter for an aliphatic polyester biodegradable resin according to claim 1, wherein the aliphatic polyester biodegradable resin is a polycondensate of an aliphatic dicarboxylic acid and a glycol.

3. The method of using basic magnesium sulfate as a degradation promoter for an aliphatic polyester biodegradable resin according to claim 2, wherein the aliphatic polyester biodegradable resin is polybutylene succinate-adipate.

4. The method of using basic magnesium sulfate as a degradation promoter for an aliphatic polyester biodegradable resin according to claim 1, wherein at least a part of the basic magnesium sulfate is fibrous basic magnesium sulfate.

5. The method of using basic magnesium sulfate as a degradation promoter for an aliphatic polyester biodegradable resin according to claim 1, wherein at least a part of the basic magnesium sulfate is flabellate basic magnesium sulfate.

6. A method for promoting degradation of an aliphatic polyester biodegradable resin, comprising adding basic magnesium sulfate to the aliphatic polyester biodegradable resin to form a mixture, kneading the mixture, and exposing the mixture to a marine environment.

* * * * *